United States Patent
Jagadishprasad et al.

(10) Patent No.: US 9,201,486 B2
(45) Date of Patent: Dec. 1, 2015

(54) LARGE SCALE DYNAMIC POWER BUDGET ADJUSTMENTS FOR OPTIMIZING POWER UTILIZATION IN A DATA CENTER

(75) Inventors: Praveen K. Jagadishprasad, Karnataka (IN); Gururaja A. Nittur, Karnataka (IN); Roy Zeighami, McKinney, TX (US); Antony J. Harvey, Houston, TX (US)

(73) Assignee: Cisco Technology, Inc., San Jose, CA (US)

(*) Notice: Subject to any disclaimer, the term of this patent is extended or adjusted under 35 U.S.C. 154(b) by 946 days.

(21) Appl. No.: 13/403,126

(22) Filed: Feb. 23, 2012

(65) Prior Publication Data

US 2013/0226362 A1    Aug. 29, 2013

(51) Int. Cl.
*G06F 1/26* (2006.01)
*G06F 1/32* (2006.01)
*G06F 9/50* (2006.01)

(52) U.S. Cl.
CPC ............ *G06F 1/3203* (2013.01); *G06F 9/5094* (2013.01); *Y02B 60/142* (2013.01)

(58) Field of Classification Search
CPC ............ G06F 1/18; G06F 1/189; G06F 1/32; G06F 1/3203; G06F 9/5094; Y02B 60/142; Y02B 60/1278; Y02B 60/1282
See application file for complete search history.

(56) References Cited

U.S. PATENT DOCUMENTS

| | | |
|---|---|---|
| 2004/0255171 A1 | 12/2004 | Zimmer et al. |
| 2005/0283624 A1 | 12/2005 | Kumar et al. |
| 2007/0300083 A1* | 12/2007 | Goodrum et al. ............. 713/300 |
| 2009/0113221 A1* | 4/2009 | Holle et al. ................... 713/310 |
| 2009/0125737 A1* | 5/2009 | Brey et al. ..................... 713/322 |
| 2009/0132842 A1 | 5/2009 | Brey et al. |
| 2010/0070787 A1* | 3/2010 | Bieswanger et al. ......... 713/322 |
| 2012/0072745 A1* | 3/2012 | Ahluwalia et al. ............ 713/320 |
| 2012/0116599 A1* | 5/2012 | Arndt et al. ................... 700/291 |
| 2012/0117390 A1* | 5/2012 | Arndt et al. ................... 713/300 |

OTHER PUBLICATIONS

Hewlett-Packard Development Company, "HP Power Capping and HP Dynamic Power Capping for ProLiant Servers," Jan. 2011.

\* cited by examiner

*Primary Examiner* — Fahmida Rahman
(74) *Attorney, Agent, or Firm* — Edell, Shapiro & Finnan, LLC

(57) ABSTRACT

A data center system management device receives power configuration information for one or more power groups. Each power group has one or more servers. The power configuration information has a power group power limit for each power group. The power budgets are sent to server control units within each power group. Messages are received from each of the server control units, the messages including information to indicate whether servers in the power groups have a power deficit or a power surplus, and a number of power units for the power deficit and power surplus for each server. The server power budgets of the one or more servers in each of the one or more power groups based on power deficits and power surpluses within each power group using a priority based reallocation mechanism.

24 Claims, 5 Drawing Sheets

| Receive power configuration information for one or more power groups comprising one or more servers, wherein the power configuration information comprises a power group power limit for each of the one or more power groups | 410 |

↓

| Send messages to server control units within each power group, the messages comprising information that indicates a power budget for servers under control of corresponding server control units | 420 |

↓

| Receive from each of the server control units messages comprising information to indicate whether servers under the control of corresponding server control units have a power deficit or a power surplus, and a number of power units for the power deficit and power surplus for each server | 430 |

↓

| Adjust the server power budgets of the one or more servers in each of the one or more power groups based on power deficits and power surpluses within each power group | 440 |

LARGE SCALE DYNAMIC POWER BUDGET ADJUSTMENTS FOR OPTIMIZING POWER UTILIZATION IN A DATA CENTER

TECHNICAL FIELD

The present disclosure relates to data center power allocation and power optimization within data center power groups.

BACKGROUND

In recent years, data center power and cooling have become important concerns in data center construction and operation. Industry participants have improved the efficiency of almost all the elements in the power and cooling chain, from individual chip efficiency, system design, and efficient cooling of the data center. Current operators can buy the highly efficient server designs in terms of throughput per watt.

Generally, there is no power limit enforced by a data center on the amount of power that servers and server chassis can consume. As a result, groups of servers connected to a power distribution unit are often conservatively allocated more power than they actually use. In order to avoid unnecessary power allocation to the servers, power capping may be used to safely limit the power that servers can consume at any given time. Ultimately, power planning with these limits can reduce the electricity costs of running the data center. Another challenge is to avoid tripping circuit breakers when hardware is added to a grid with a constant input power. Tripped circuit breakers can lead to cascading failures and result in financial loss. Power distribution schemes should also consider workload priority, with higher priority workloads receiving a larger power allocation.

BRIEF DESCRIPTION OF THE DRAWINGS

FIG. 4 is an example of a flow chart depicting a process for power management of a plurality of chassis units and rack server units in a power group by the central power management server.

DESCRIPTION OF EXAMPLE EMBODIMENTS

Overview

A system management device receives power configuration information for one or more power groups comprising one or more servers. The power configuration information includes a power group power limit for each of the one or more power groups. Messages are sent to server control units within each power group, the messages comprising information that indicates a power budget for servers under control of corresponding server control units. Messages are received from each of the server control units, these messages comprising information to indicate whether servers under the control of corresponding server control units have a power deficit or a power surplus, and a number of power units for the power deficit and power surplus for each server. The server power budgets of the one or more servers in each of the one or more power groups are adjusted based on power deficits and power surpluses within each power group.

Example Embodiments

Figure 1:
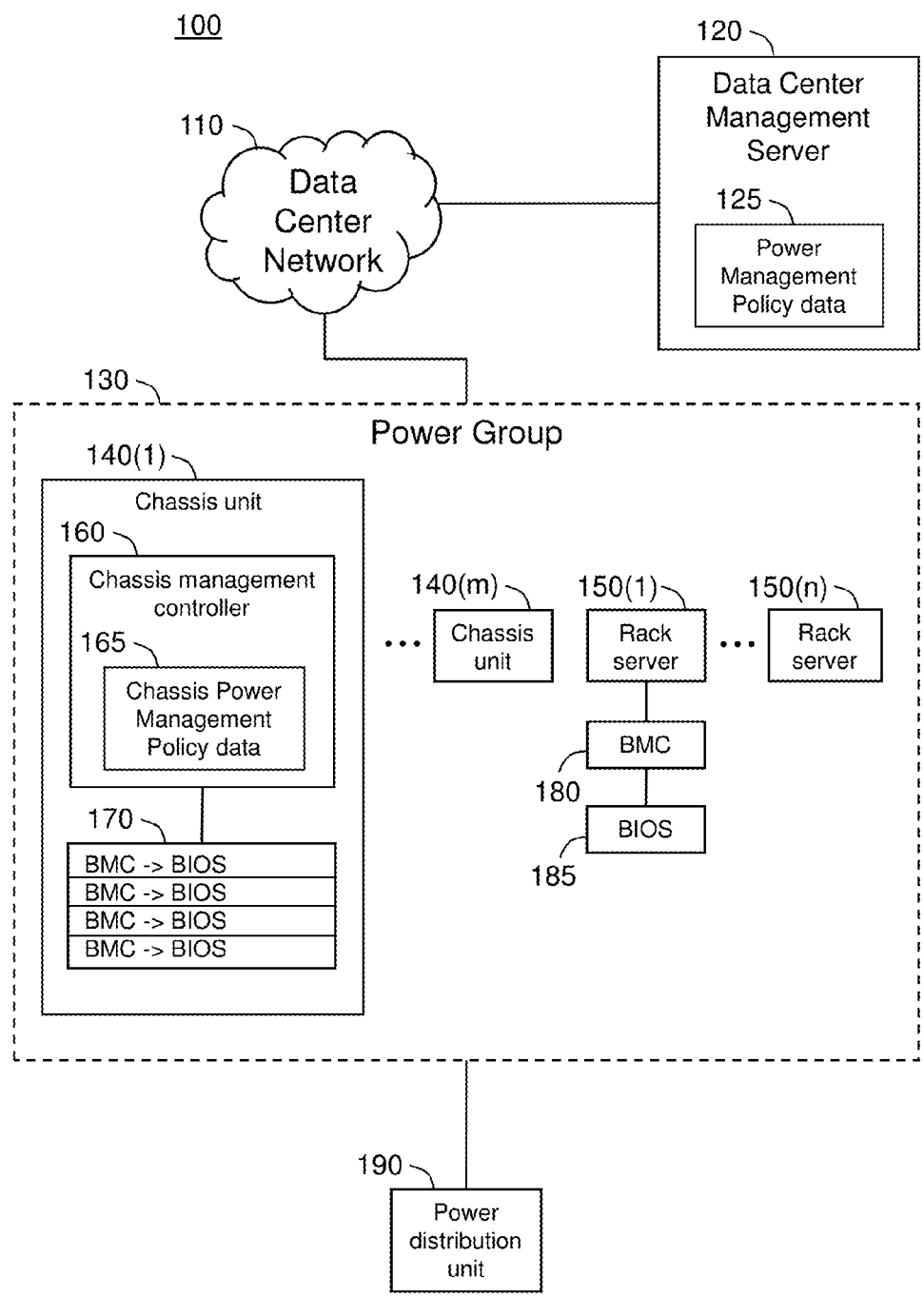
FIG. 1 shows an example of a network environment for power management of a plurality of chassis units and rack server units in a power group by a central power management server.

Referring first to FIG. 1, a system for managing and distributing power for chassis units is shown at 100. The system 100 comprises a network 110, a data center management server 120, a power group 130, and a power distribution unit (PDU) 190. Within power group 130 are plurality of chassis units 140(1)-140(m) and rack server units 150(1)-150(n). The management server 120 stores power management policy data 125. Chassis unit 140(1) houses a plurality of blade servers, shown collectively at reference numeral 170, and a chassis management controller (CMC) device configured with chassis power management policy data 165, shown at reference numeral 160. Chassis units 140(2)-140(m) are configured in a fashion similar to chassis 140(1). Rack server unit 150(1) has a baseboard management controller (BMC) 180 and a Basic Input-Output System (BIOS) 185. Rack server units 150(2)-150(n) are configured in a fashion similar to rack server 150(1). Each of the blade servers 170 also comprises a BMC and BIOS combination as shown in FIG. 1.

A power group, e.g., power group 130, is usually defined by all of the equipment serviced by a common power source, e.g., PDU 190. In one example, a power group/PDU combination is designed for a physically manageable and definable amount of power. Power is physically distributed throughout the data center much in the same way that power is distributed in a home or office building using service feeds and branch circuits, with each service feed and branch circuit having its own circuit breaker. Typically, the branch circuit will be connected to a pluggable power strip which has a plurality of alternating current (AC) power outlets for the power group's equipment. This arrangement allows data center facility management to plan and manage power consumption throughout the data center at the physical level.

More recently, power management techniques have been employed to improve power control within a power group. For example, the management server 120 communicates with the plurality of chassis units 140(1)-140(m) and rack server units 150(1)-150(n) via network 110. The management server 120 may send to the chassis units 140(1)-140(m) power management policy information that comprises a power budget and blade server priority information for each of the blade servers. The power management policy information is a subset of the power management policy data 125 that is directed to the chassis and is stored, e.g., as chassis power management policy data 165. The CMC in each of the chassis units 140(1)-140(m) then sends a maximum power consumption cap for each blade server to the respective BMCs.

For example, the chassis management controller 160 provides management services for the plurality of blade servers in its chassis unit. The chassis management controller 160 distributes power to the blade servers of the chassis based on the priority of the blade. In one example, a blade with a higher priority classification will receive more power than a blade with a lower priority classification. Also, in another example, a "busy" blade server (i.e., a blade server that is consuming much of its allocated power) will be allocated more power than a "non-busy" blade server (i.e., a blade server that is consuming little of its allocated power).

Similarly, the management server 120 communicates with the plurality of rack servers 150(1)-150(n) by way of their respective BMCs, e.g., BMC 180. The BMCs adjust performance states (P-states) and throttle states (T-states) of their corresponding processing suites by way of their respective BIOS, as will be described hereinafter.

These improved power management techniques involve algorithms to distribute power among chassis units and rack servers considering workload priority and server hardware configuration. Even with these improved power management techniques, data center management is still left with static power management at the data center level, i.e., power is assigned to a power group based on the quantity of blade servers, chassis, power supplies, rack servers, workload priority, etc.

Static power distribution becomes an issue in a dynamic data center environment in which power consumption on individual servers changes at an ever faster pace. Consider the situation with thousands of servers in a virtualized network environment and the corresponding virtual machines that are constantly being started, stopped, or migrated to other servers. In another example, email servers are busy in the day and idle at night, while code build servers are idle during the day and busy at night. In these scenarios, the power budgets would be better served by dynamically changing the power caps within power groups.

Accordingly, the techniques described herein involve a data center dynamic power group distribution process in which a data center management server, e.g., management server 120, coordinates with the CMCs and BMCs, e.g., CMC 160 and BMC 180, to achieve both dynamic power distribution across power groups and dynamic power distribution across chassis units and rack server units within a power group. The dynamic power group distribution process will be described herein in connection with the remaining figures with respect to the various components implementing the process, i.e., management server 120, CMCs, and BMCs.

Figure 2:
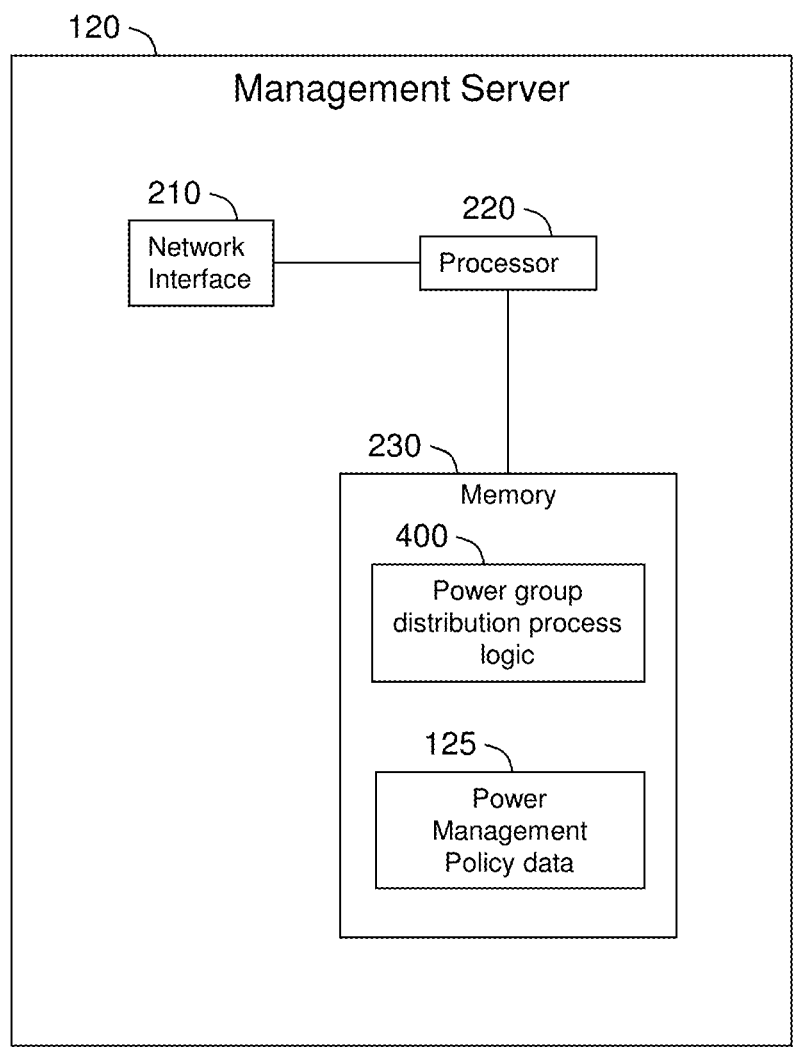
FIG. 2 is an example of a block diagram of the power management server that is configured to allocate power budgets to a plurality of power groups.

Referring to FIG. 2, an example of the management server device 120 is shown. The management server device 120 comprises a network interface device 210, a processor 220, and a memory 230. The memory stores power management policy data 125, e.g., that may be entered into the management server by the data center operator through a user interface, received as a download, or retrieved from a database. The power management policy data 125 may be a subset of a larger set of data that may be referred to as a service profile. The power management policy data is also referred to herein as power configuration information. The power management policy data 125 may include power configuration information for one or more groups of one or more servers, as described further hereinafter. Also resident in memory are instructions for power group distribution process logic 400. Briefly, the power group distribution process logic 400 is configured to cause the processor in the management server device 120 to dynamically manage power budgets for servers within power groups. The operations of the power group distribution process logic 400 are described in greater detail in connection with FIG. 4.

The network interface device 210 is configured to enable communications over network 110 to, among other things, receive policy information from a data center operator and forward policy information to the various CMCs and BMCs in system 100. The policy information contains power limit information indicating a power budget for each of the chassis units and rack servers that the management server device 120 manages. The policy information also may contain information such as server priority information that indicates, for example, priority for servers to access power.

Processor 220 is coupled to the network interface device 210 and to memory 230. Processor 220 is, for example, a microprocessor or microcontroller that is configured to execute program logic instructions (i.e., software) for carrying out various operations and tasks described herein. For example, the processor 220 is configured to execute power group distribution process logic 400 that comprises instructions stored in memory 230, in order to distribute power to and within the plurality of power groups as described hereinafter. The functions of processor 220 may be implemented by instructions encoded in one or more tangible computer readable media (e.g., embedded logic such as an application specific integrated circuit, digital signal processor instructions, software that is executed by a processor, etc.), wherein memory 230 stores data used for the operations described herein and stores software or processor executable instructions that are executed to carry out the operations described herein.

Memory 230 may comprise read only memory (ROM), random access memory (RAM), magnetic disk storage media devices, optical storage media devices, flash memory devices, electrical, optical, or other physical/tangible memory storage devices. Thus, in general, the memory 230 may comprise one or more tangible (non-transitory) computer readable storage media (e.g., a memory device) encoded with software comprising computer executable instructions and when the software is executed (by the processor 220) it is operable to perform the operations described herein in connection with power group distribution process logic 400.

Figure 3:
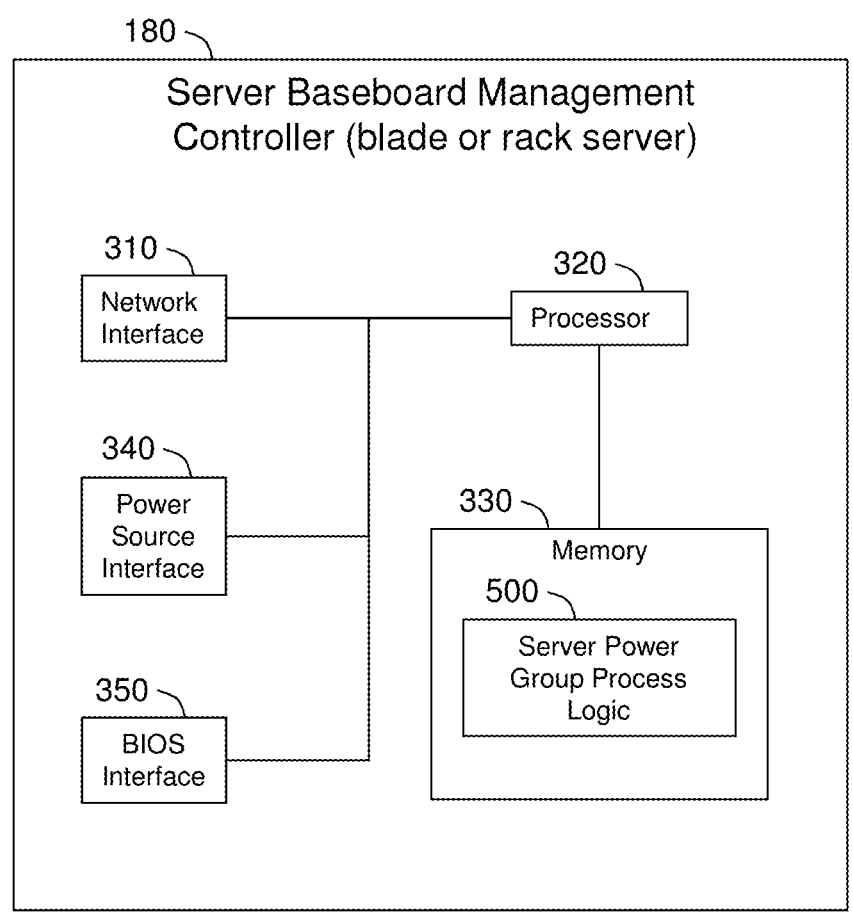
FIG. 3 is an example of a block diagram of a rack server baseboard management controller (BMC) that is configured to manage power consumption for a blade server or a rack server.

Referring to FIG. 3, an example of the server baseboard management controller device is shown, e.g., BMC 180 or a BMC associated with a blade server. The baseboard management controller 180 comprises a network interface device 310, a processor 320, a memory 330, a power source interface device 340, and a BIOS interface 350. The network interface device 310 is configured to enable communications over network 110 to communicate with management server 120 and a CMC in the case of a blade server. The baseboard management controller 180 receives power limit information via the network interface 310. The management server 120 communicates directly with the baseboard management controller 180 to set power budgets for the rack server.

The power source interface 340 is configured to receive power from a power source, e.g., PDU 190. The BIOS interface 350 allows for the baseboard management controller 180 to set P-states and T-states in the BIOS for any server processors in the rack server.

Processor 320 is coupled to the network interface device 310, to memory 330, to the power source interface device 340, and to the BIOS interface 350. The processor 320 is configured to execute server power group process logic 500 that is stored in memory 330 in order to coordinate with the management server 120 to manage power used by the server, e.g., blade or rack server. Operation of the server power group process logic 500 is described hereinafter in connection with the flow chart of FIG. 5. The processor 320 and memory 330 may be configured in a similar manner as the processor 220 and memory 230 described in connection with FIG. 2.

The BMC for both blade servers and rack servers has a configurable thermal threshold for each processor or central processing unit (CPU) and will regulate the power usage of the CPU based on the thermal reading of the CPU (e.g., the CPU temperature) when compared to the thermal threshold for the CPU. To this end, there is a temperature sensor in or associated with the CPU that supplies a temperature measurement to the BMC. For example, when the thermal reading of the CPU temperature exceeds the pre-determined threshold, the BMC will lower the power usage of the CPU.

In order to regulate the power usage of each server, the BMC may manipulate the P-state and T-state of the CPU. By manipulating the P-state, the BMC can increase or reduce the power consumption of the blade server by changing the CPUs clock rate. By manipulating the T-state, the BMC can increase or reduce the thermal threshold for the CPU by changing the CPU duty cycle without changing the clock rate. In general, a lower P-state value for a CPU indicates a higher power consumption for the CPU, and a lower T-state value for a CPU indicates a higher thermal threshold (and thus a higher power threshold) for the CPU.

For example, the blade management controller can increase the power consumption of the blade server by decreasing the P-state value associated with the CPU (i.e., "upgrading" the CPU power consumption). Similarly, the blade management controller can decrease the power consumption of the blade server by increasing the P-state value associated with the CPU (i.e., "downgrading" the CPU power consumption).

Additionally, the BMC may provide a power usage status to the management server at frequent time intervals or upon request, and the management server may use this power usage status information to monitor the actual power consumption of the rack server. When used in connection with a blade server in a chassis, the BMC may provide a power usage status to the managing CMCs at frequent time intervals, and the CMC may use this power usage status information to monitor the actual power consumption of the respective blade servers, and report the associated status information to the management server.

There are other components in system 100 and in each of the servers as one ordinary skill in the art would appreciate, but for simplicity, those components are omitted in FIGS. 1-3.

Reference is now made to FIG. 4, with additional reference to FIGS. 1 and 2, for a description of the power group distribution process logic 400 executed by a data center management server, e.g., management server 120. The power group distribution process logic 400 is used for performing power distribution among the power groups based on server priority, status information, and power deficits and surpluses within the power groups. At 410, power configuration information (for the power management policy data 125, depicted in FIG. 2) is received for one or more power groups comprising one or more servers. The power configuration information includes power limit information indicating a power budget for power groups managed by the management server 120. The power configuration information may also include chassis unit and blade server priority information indicating priority for access to power for each of a plurality of blade servers in the chassis unit, chassis configuration (e.g., number of power supplies and physical blade slots), and power budgets for rack servers in the power group. Some of the policy information may be forwarded to CMCs, e.g., CMC 160, in order for the CMCs to allocate power within the chassis, e.g., by way of chassis power management policy data 165.

The policy information may also assign different blade servers within each chassis unit to one of a plurality of priority classes for access to power. For example, some blade servers within a chassis unit may be assigned to a higher priority class while other blade servers are assigned to a medium priority class or a lower priority class. Thus, in this example, chassis units with more blade servers in higher blade server priority classes may be allocated more power relative to other chassis units with fewer blade servers in higher blade server priority classes.

By way of example, for initial power allocation within the power group, let G1 be the group power that a facility administrator enters into the system. Next, G2 is determined for the group power after subtracting from G1, fixed power allocations including minimum boot power of all servers, power for chassis (input/output modules, fans, power supplies), and maximum power for servers which are outside of power cap control, e.g., servers that have special priority with no power cap. Then, G2 is distributed in proportion to two parameters. The first parameter is server priority, e.g., priorities ranging from 1 to 10, with a 1 designating the highest priority and 10 designating the lowest priority. The second parameter is power range. For example, let X be a range of additional power to be allocated to an individual server such that X is equal to a maximum server power minus boot power, boot power having been accounted for in the G2 calculation. A weight $W_s$ for each server may be equal to N+1-priority, for priorities 1-10. This ensures 1 is the highest priority and N is the lowest priority. The additional power allocation for each server is directly proportional to $W_s \times X$. Power is then allocated to each server in decreasing order of weight, with G2 being reduced accordingly after each allocation. If a server has been allocated power which results in the server power being in excess of maximum possible consumption, the spare power (difference of current allocation and maximum) is added back to G2. One advantage of the initial power allocation scheme described above is that it achieves efficiency and scalability with a single iteration, while typical initialization schemes are performed with multiple iterations for each server sequence until G2 is zero or all servers have received their maximum allocation.

At 420, messages are sent to server control units within each power group, the messages comprising information that indicates a power budget for servers under control of corresponding server control units. The server control units may be CMCs or BMCs for rack servers, as described above. Upon receiving the power budget information, the server control units may reserve a predetermined amount of power from the power budget for chassis cooling and power purposes. BMCs will then control power consumption for the processing portion of the rack server, while CMCs may distribute the power remaining in the power budget to the plurality of blade servers in the chassis.

At 430, messages are received from each of the server control units comprising information to indicate whether servers under the control of corresponding server control units have a power deficit or a power surplus, and a number of power units for the power deficit and power surplus for each server. At 440, the server power budgets of the one or more servers in each of the one or more power groups are adjusted based on power deficits and power surpluses within each power group, while maintaining data center power policy, e.g., for respective power groups. The management server 120 may use several techniques to adjust the server power budgets, as described hereinafter.

The management server 120 may also store data that assigns each of the servers to one of a plurality of priority classes, where each priority class has a relative priority, e.g., 1, 2, 3, etc., as described above. Servers with higher performance, e.g., newer, faster, and more efficient servers may be given a higher priority. The management server 120 may adjust or distribute power to each of the chassis units and rack servers based on the associated server priority class such that servers with a higher relative priority receive more power than servers with a lower relative priority. In one example, servers that are classified in the same server priority class may receive an equal amount of power. In the case of blade servers, all the blade servers of a chassis unit that are classified in a low priority class may receive the same relative low power, the blade servers that are classified in a medium priority class may receive the same relative medium power and the blade servers that are classified in a high priority class may receive the same relative high power. The management server 120 may the sum the allocations for the blade servers in each chassis to determine the chassis power budget. The adjusted power budgets for servers in each of the each chassis and rack servers in the power group are notified of the adjusted power budget.

Figure 5:
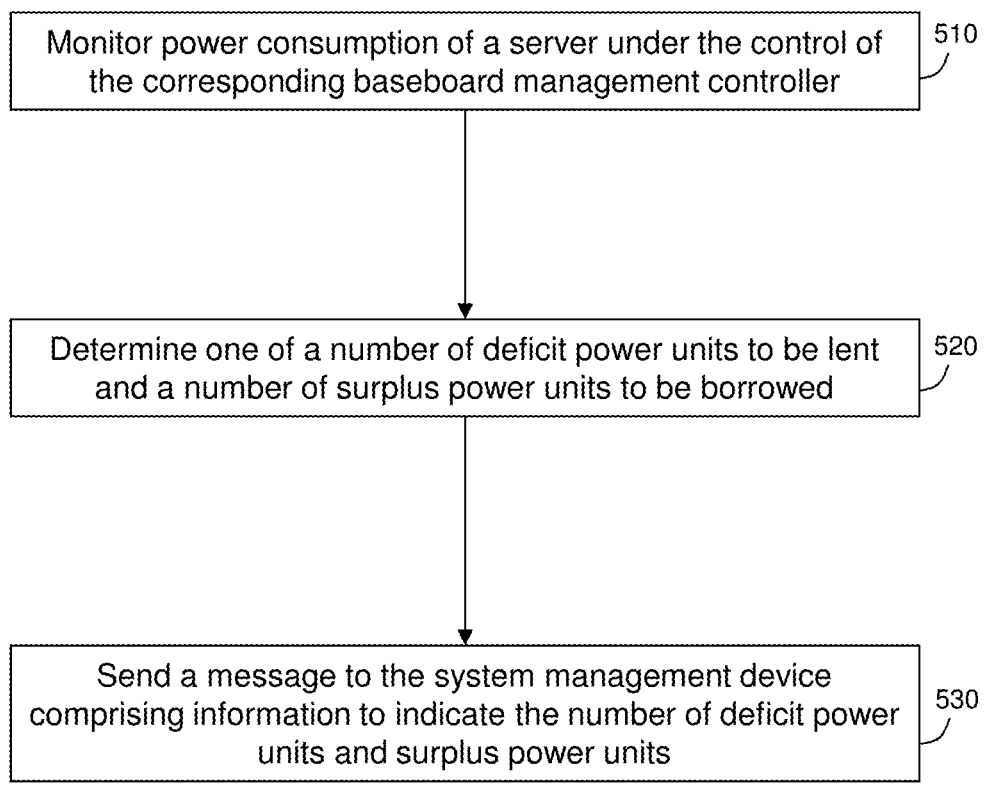
FIG. 5 is an example of a flow chart depicting a process for a BMC to participate in power management.

Turning to FIG. 5, an example of a flow chart is now described of the operations of the BMC power group process logic 500 executed by server control units comprising rack server baseboard management controllers, e.g., BMC 180, to monitor server power consumption. At 510, power consumption is monitored for each server under the control of the corresponding baseboard management controller. At 520, one of a number of deficit power units to be lent and a number of surplus power units to be borrowed is determined. At 530, a message is sent to the system management device, e.g., management server 120, the message comprising information to indicate the number of deficit power units and surplus power units.

The system management device, e.g., management server 120, receives the messages and compiles the surplus and deficit information. The deficit power units are matched with the surplus power units. The matching may be such that deficit power units with a higher server priority class have their power requirement satisfied before deficit power units with a lower server priority class. The matching of deficit power units from a server that has previously lent surplus power units may be performed prior to matching any remaining deficit power units. The management server 120 adjusts the server power budgets by reallocating the power for each of the servers in the one or more power groups based on matched deficit and surplus power units, while the CMCs and BMCs manage power for their blade servers and rack servers, respectively.

The power units may be referred to as quanta or a quantum of power due to their discrete nature, e.g., a number of watts or a number of incremental power units that may be achieved by changing a P-state and/or a T-state of a server processor, sometimes referred to as a service processor (SP), since other processing components may be part of a server. Thus, a power unit may be a predetermined amount of power corresponding to a unit power adjustment that an individual server can accommodate.

Some CMCs and BMCs use average power to determine a quantum. Under certain circumstances this may lead to undesirable results. For example, a BMC toggles between P-states and has the knowledge of when its power cap has been exceeded, as that knowledge is fundamental in deciding when a P-state should change. The BMC can use a counter to accumulate the number of such P-state changes that increase power consumption. If P-states changes occur for a given percentage of time or a certain number of times within a predetermined interval, the BMC can make/issue a borrow request. If a server has lent power previously and the server needs to obtain more power, the server will make a borrow request immediately for some or all of the previously lent power.

When the above technique is compared to an averaging approach, the power cap may be reached 50% of the time while the processor idles and 50% of the time leading average below the power cap. Since the average is below the power cap, a borrow request would not be raised. In another approach, operating at the power cap may be performed a given percentage of time. If a server has lent power previously and the server needs to obtain more power, the server will make a borrow request immediately for some or all of the previously lent power.

Lending power can be decided as consumption at, e.g., the 80th percentile (based on samples), i.e., when the server has power to lend 80% of the time. Lending may also be based on average power consumption. Furthermore, a time period may be required before subsequent borrowing and lending requests may be made in order to prevent hysteresis or systemic thrashing due to a high frequency of requests.

Accordingly, the BMCs have the intelligence to continuously monitor and decide when to raise the request and to decide the size (the number of quantum units) of the request, and when to offer lendable quanta. The requests and offers are sent directly to the management server. This provides for an asynchronous solution that does not overburden the management server processor.

Accordingly, the management server 120 can concentrate on the core lender-borrower matching algorithm. In this regard, the management server organizes the borrower quanta in two sequential steps. First, lenders who previously lent and have made a borrow request may be listed first. Second, the remaining borrower quanta are sorted from highest workload or server priority to lowest. Next, the lender quanta are sorted from largest to smallest. Starting with the borrower with highest priority, a match is made with a lender such that the difference in the size of the borrower and lender quanta is a minimum. If there is no single lender to fulfill the borrower's request, then the lenders are iterated through in decreasing order.

Once the borrower is satisfied, that borrower is removed from the borrower list. When a lender has been exhausted, then that lender is removed from the lender list. The process ends when either all lending quanta are exhausted or when all the borrower quanta are satisfied. This process ensures that higher priority workloads are satisfied such that only low priority workloads are starved should there be a shortage of lender quanta.

In another example, the management server 120 optimizes borrower and lender matching such that a minimum number of lenders are used to satisfy a borrower or borrowers. This helps to ensure that when a lender needs to get back the lent power, the lender may be restored to original power limit more quickly. The same reasoning applies to the matching of borrowers and lenders with the closest match or match with the least number of lenders.

The asynchronous nature of the techniques described herein can lead to very slow updates when workload has stabilized or lead to very fast and varying updates when workload is dynamic. For slow updates, a maximum time interval may be specified after which power group adjustments are automatically performed. For fast updates, the update requests may be batched and power group adjustments are made periodically. Factors for determining the update period for fast updates may include a smaller period that is useful to ensure up-to-date power allocations, to ensure that a lender captures lent quanta, and to promote high server utilization. Factors for determining the update period for slow updates may include a longer period that is useful to amortize processing costs and to promote stability in systems where frequent power rebalancing is undesired.

Furthermore, when a power cap is applied, convergence to a correct P-state for the various processors is not instantaneous and may take a certain number of milliseconds. For example, a sequence of P-states which are tried before the appropriate P-state is selected. The minimum period for power group adjustments made by the management server 120 should be much longer than the P-state stabilization time and may vary depending on the types of equipment in the power group.

It should be understood that while the techniques provided herein are described with regard to data center operations, these techniques also apply to smaller operations that may not be considered a "data center", e.g., a small campus operation that may still wish to obtain power efficiency or anticipates growth. Furthermore, there may be mission critical applications that are not given a power cap. The power budget used herein that consider baseline power needs for chassis, racks, and servers, e.g., fixed power requirements such as boot power, and baseline chassis and rack power. In addition, power policy may consider the number of rack and chassis power supply units, minimizing the occurrence of a tripped circuit breaker and data center brown-outs.

The techniques described herein provide for detecting the addition, removal, or failure of servers within respective power groups such that the respective power groups have an updated server configuration and the server power budgets in each of the one or more power groups is adjusted based on the updated server configuration. The management server 120 may query the server control units (BMCs/CMCs) for the power status of each of the servers.

In sum, a method is provided for a system management device to receive power configuration information for one or more power groups comprising one or more servers. The power configuration information comprises a power group power limit for each of the one or more power groups. Messages are sent to server control units within each power group, the messages comprising information that indicates a power budget for servers under control of corresponding server control units. Messages are received from each of the server control units, these messages comprising information to indicate whether servers under the control of corresponding server control units have a power deficit or a power surplus, and a number of power units for the power deficit and power surplus for each server. The server power budgets of the one or more servers in each of the one or more power groups are adjusted based on power deficits and power surpluses within each power group.

In addition, an apparatus is provided comprising: a network interface device configured for communication over a network with a plurality of servers in one or more power groups; a memory; and a processor configured to be coupled to the network interface device and the memory. The processor is configured to receive and store in the memory power configuration information for one or more power groups comprising one or more servers, where the power configuration information comprises a power group power limit for each of the one or more power groups; send messages via the network interface to server control units within each power group, the messages comprising information that indicates a power budget for servers under control of corresponding server control units; receive from each of the server control units via the network interface messages comprising information to indicate whether servers under the control of corresponding server control units have a power deficit or a power surplus; and adjust the server power budget in each of the one or more power groups based on power deficits and power surpluses within each power group.

Similarly, one or more computer readable storage media is provided that is encoded with software comprising computer executable instructions and when the software is executed operable to: receive power configuration information for one or more power groups comprising one or more servers, where the power configuration information comprises a power group power limit for each of the one or more power groups; send to server control units within each power group messages comprising information that indicates a power budget for servers under control of corresponding server control units; receive from each of the server control units messages comprising information to indicate whether servers under the control of corresponding server control units have a power deficit or a power surplus; and adjust the server power budget in each of the one or more power groups based on power deficits and power surpluses within each power group.

The above description is intended by way of example only. Various modifications and structural changes may be made therein without departing from the scope of the concepts described herein and within the scope and range of equivalents of the claims.

What is claimed is:

1. A method comprising:
   at a system management device, receiving power configuration information for one or more power groups comprising one or more servers, wherein the power configuration information comprises a power group power limit for each of the one or more power groups;
   sending messages to server control units within each of the one or more power groups, the messages comprising information that indicates a power budget for servers under control of corresponding server control units;
   receiving from each of the server control units messages comprising information to indicate whether servers under the control of corresponding server control units have a power deficit or a power surplus, and a number of power units for the power deficit and the power surplus for each server;
   adjusting the server power budgets of the one or more servers in each of the one or more power groups based on power deficits and power surpluses within each power group;
   matching deficit power units with surplus power units, including identifying a power deficit server that has previously lent surplus power but now has a power deficit and giving the server a higher priority over other power deficit server(s) that have not previously lent surplus power; and
   initializing the power budget for each of the servers under control of the corresponding server control units by computing a power allocation that is proportional to a difference of a maximum power of a corresponding server and a minimum boot power of the corresponding server.

2. The method of claim 1, further comprising storing data that assigns each of the servers to one of a plurality of priority classes, wherein each priority class has a relative priority.

3. The method of claim 2, wherein adjusting comprises adjusting the server power budgets in each of the one or more power groups based on the priority class for each server within a respective power group.

4. The method of claim 2, further comprising at each of the server control units:
   monitoring power consumption of each of the servers under the control of the corresponding server control units;

determining one of a number of deficit power units to be lent and a number of surplus power units to be borrowed; and sending to the system management device a message comprising information to indicate the number of deficit power units and surplus power units, and a corresponding server priority class associated with each deficit power unit.

5. The method of claim 4, further comprising at the system management device:

matching the deficit power units with the surplus power units such that deficit power units with a higher server priority class have their power requirement satisfied before deficit power units with a lower server priority class; and wherein adjusting comprises reallocating the server power budgets in each of the one or more power groups based on matching the deficit and surplus power units.

6. The method of claim 5, wherein sending comprises sending messages further comprising information to identify a server associated with individual deficit and surplus power units.

7. The method of claim 1, further comprising at each of the server control units:

monitoring power consumption of each of the servers under control of the server control unit;

determining one of a number of deficit power units to be lent and a number of surplus power units to be borrowed; and sending a message to the system management device comprising information to indicate a number of power units for each power deficit and power surplus.

8. The method of claim 7, wherein monitoring comprises monitoring power state changes of each of the servers that occur due to load changes on respective servers, and wherein determining comprises determining the number of surplus power units and the number of deficit power units based on the power state changes.

9. The method of claim 1, further comprising:

detecting addition, removal, or failure of servers within respective power groups such that the respective power groups have an updated server configuration; and wherein adjusting comprises reallocating the server power budgets in each of the one or more power groups based on the updated server configuration.

10. The method of claim 1, wherein sending messages, receiving messages, and adjusting the server power budgets are performed periodically.

11. The method of claim 1, further comprising querying the server control units for a power status of each of the servers.

12. The method of claim 1, wherein a power unit comprises a predetermined amount of power corresponding to a unit power adjustment that an individual server can accommodate.

13. The method of claim 1, wherein initializing the power budget for each of the servers under control of the corresponding server control units is also based on an associated power group power limit and a server priority assigned to each server.

14. The method of claim 13, wherein initializing comprises computing the power budget for each server using a server weight that is proportional to the server priority assigned to the corresponding server.

15. One or more non-transitory computer readable storage media encoded with software comprising computer executable instructions and when the software is executed, the software is operable to:

receive power configuration information for one or more power groups comprising one or more servers, wherein the power configuration information comprises a power group power limit for each of the one or more power groups;

send messages to server control units within each of the one or more power groups, the messages comprising information that indicates a power budget for servers under control of corresponding server control units;

receive from each of the server control units messages comprising information to indicate whether servers under the control of corresponding server control units have a power deficit or a power surplus, and a number of power units for the power deficit and the power surplus for each server;

adjust the server power budgets of the one or more servers in each of the one or more power groups based on power deficits and power surpluses within each power group;

match deficit power units with surplus power units, including identifying a power deficit server that has previously lent surplus power but now has a power deficit and giving the server a higher priority over other power deficit server(s) that have not previously lent surplus power; and initialize the power budget for each of the servers under control of the corresponding server control units by computing a power allocation that is proportional to a difference of a maximum power of a corresponding server and a minimum boot power of the corresponding server.

16. The non-transitory computer readable storage media of claim 15, further comprising computer executable instructions operable to:

store data that assigns each of the servers to one of a plurality of priority classes, wherein each priority class has a relative priority.

17. The non-transitory computer readable storage media of claim 16, wherein the instructions operable to adjust comprise instructions operable to adjust the server power budgets in each of the one or more power groups based on the priority class for each server within a respective power group.

18. The non-transitory computer readable storage media of claim 17, further comprising computer executable instructions operable to:

match the deficit power units with the surplus power units such that deficit power units with a higher server priority class have their power requirement satisfied before deficit power units with a lower server priority class; and wherein the instructions operable to adjust comprise instructions operable to reallocate the server power budgets in each of the one or more power groups based on matching the deficit and surplus power units.

19. The non-transitory computer readable storage media of claim 15, further comprising computer executable instructions operable to:

detect addition, removal, or failure of servers within respective power groups such that the respective power groups have an updated server configuration; and wherein the instructions operable to adjust comprise instructions operable to reallocate the server power budgets in each of the one or more power groups based on the updated server configuration.

20. An apparatus comprising:

a network interface device configured to enable communication over a network with a plurality of servers in one or more power groups;

a memory; and a processor configured to be coupled to the network interface device and the memory, wherein the processor is configured to:
  store in the memory power configuration information for one or more power groups comprising one or more servers, wherein the power configuration information comprises a power group power limit for each of the one or more power groups;
  send messages via the network interface device to server control units within each of the one or more power groups, the messages comprising information that indicates a power budget for servers under control of corresponding server control units;
  receive, from each of the server control units via the network interface device, messages comprising information to indicate whether servers under the control of corresponding server control units have a power deficit or a power surplus, and a number of power units for the power deficit and the power surplus for each server;
  adjust the server power budgets of the one or more servers in each of the one or more power groups based on power deficits and power surpluses within each power group;
  match deficit power units with surplus power units, including identifying a power deficit server that has previously lent surplus power but now has a power deficit and giving the server a higher priority over other power deficit server(s) that have not previously lent surplus power; and
  initialize the power budget for each of the servers under control of the corresponding server control units by computing a power allocation that is proportional to a difference of a maximum power of a corresponding server and a minimum boot power of the corresponding server.

21. The apparatus of claim 20, wherein the processor is further configured to:
  store in the memory data that assigns each of the servers to one of a plurality of priority classes, wherein each priority class has a relative priority.

22. The apparatus of claim 21, wherein the processor is configured to adjust the server power budgets in each of the one or more power groups based on the priority class for each server within a respective power group.

23. The apparatus of claim 22, wherein the processor is further configured to:
  match the deficit power units with the surplus power units such that deficit power units with a higher server priority class have their power requirement satisfied before deficit power units with a lower server priority class; and
  reallocate the server power budgets in each of the one or more power groups based on matching the deficit and surplus power units.

24. The apparatus of claim 20, wherein the processor is further configured to:
  detect addition, removal, or failure of servers within respective power groups such that the respective power groups have an updated server configuration; and
  reallocate the server power budgets in each of the one or more power groups based on the updated server configuration.

* * * * *